April 18, 1961 C W. MUSSER 2,979,964
MICROLINEAR ACTUATOR
Filed May 13, 1960 2 Sheets-Sheet 1
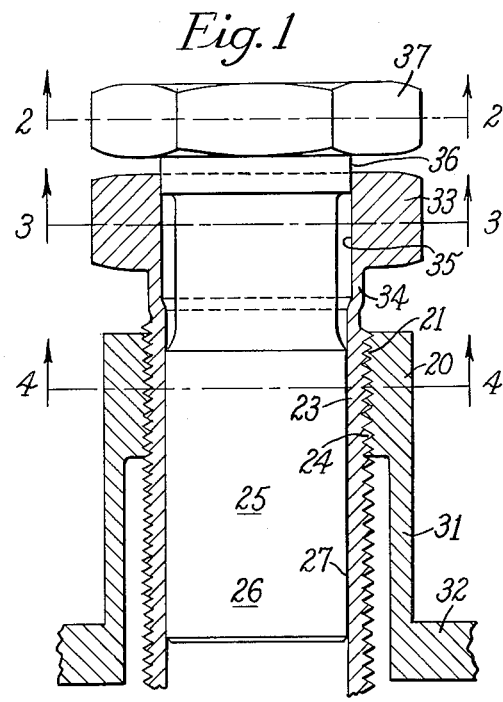
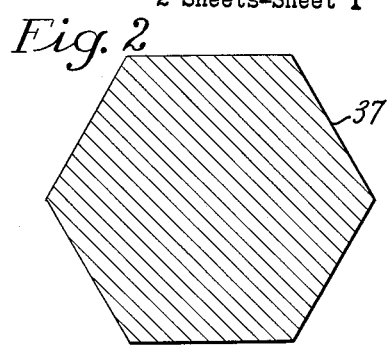
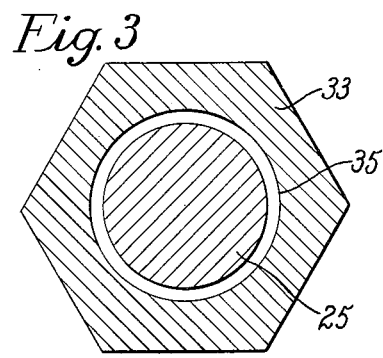
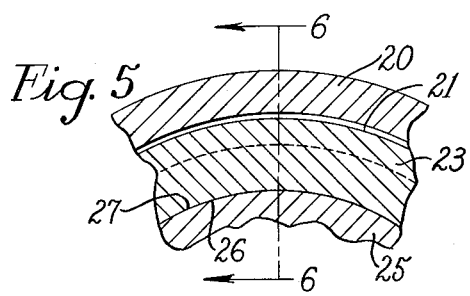
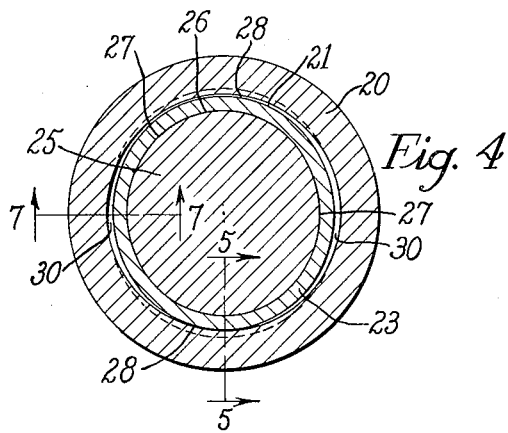
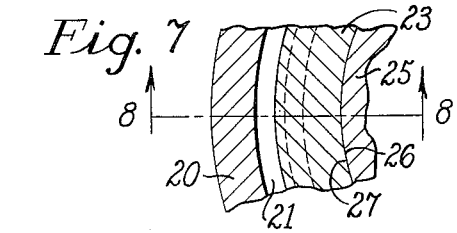
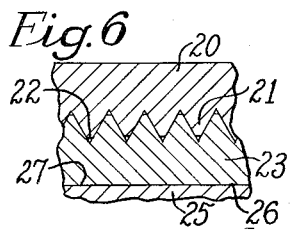
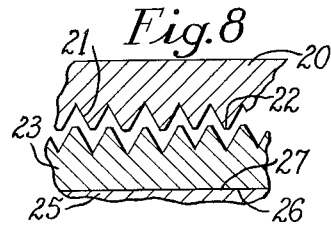
Inventor
C Walton Musser
By his Attorney

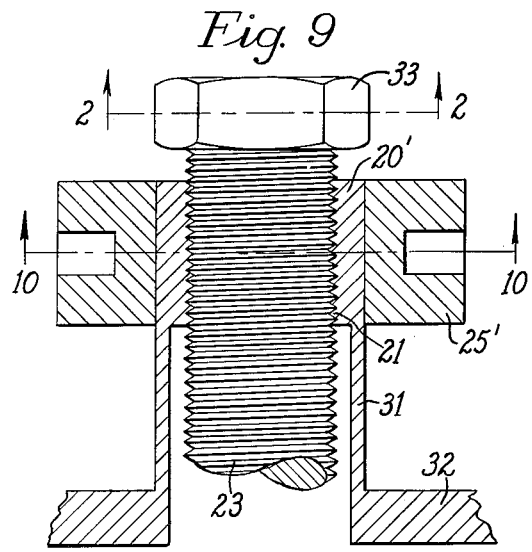
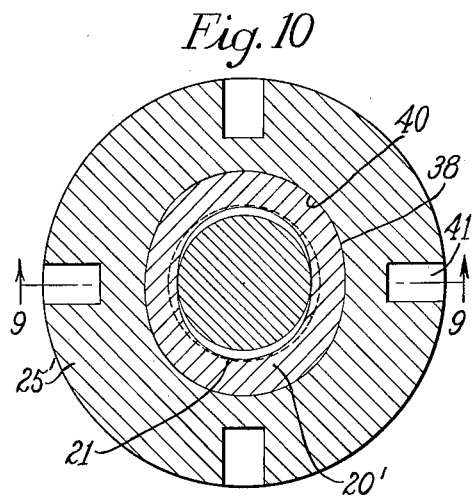
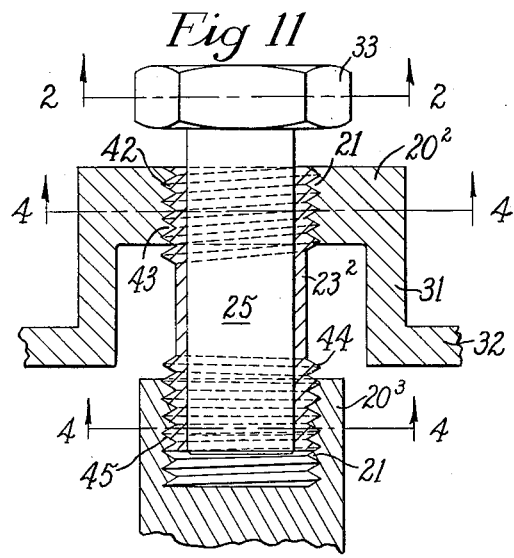
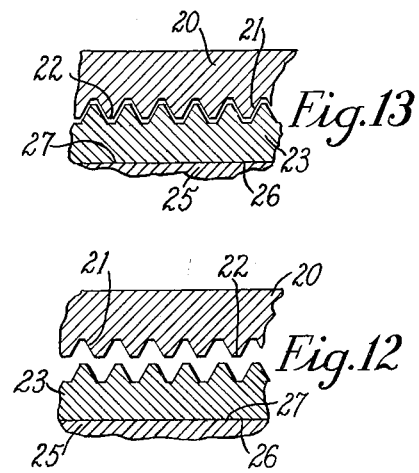
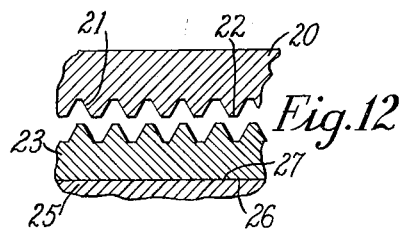

United States Patent Office 2,979,964
Patented Apr. 18, 1961

2,979,964

MICROLINEAR ACTUATOR

C Walton Musser, Beverly, Mass., assignor to United Shoe Machinery Corporation, Boston, Mass., a corporation of New Jersey Filed May 13, 1960, Ser. No. 29,002

7 Claims. (Cl. 74—424.8)

The present invention relates to microlinear actuators.

A purpose of the invention is to obtain minute adjustment in a linear direction.

A further purpose is to secure a combination of coarse and fine linear adjustments.

A further purpose is to secure a microlinear adjustment which will have negligible wear.

A further purpose is to secure a microlinear adjustment in which all threads are in engagement so that the position of the parts will be determined with a high degree of precision, and will not be subject to variation due to tolerance differences on an individual thread.

A further purpose is to eliminate backlash in a microlinear adjustment.

A further purpose is to spring preload the parts of a screw and nut combination in a microlinear adjustment.

A further purpose is to greatly simplify the construction and reduce the expense of a microlinear adjustment.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a fragmentary axial section of a preferable embodiment of the microlinear adjustment of the present invention.

Figure 2 is a section of Figure 1 or Figure 11 on the line 2—2.

Figure 3 is a section of Figure 1 on the line 3—3.

Figure 4 is a section of Figure 1 or Figure 11 on the line 4—4. It is not however completely referable to Figure 11 without allowance for the difference in scale.

Figure 5 is an enlarged fragmentary sectional view showing the relation of the threads at the position of the line 5—5 of Figure 4.

Figure 6 is a section of the device of Figure 1, the section being taken on the line 6—6 of Figure 5.

Figure 7 is an enlarged fragmentary sectional view showing the relation of the threads at the position of the line 7—7 of Figure 4.

Figure 8 is a section on the line 8—8 of Figure 7.

Figure 9 is a fragmentary axial section of a modified embodiment of the invention, the section being taken on the line 9—9 of Figure 10.

Figure 10 is a section of Figure 9 on the line 10—10.

Figure 11 is a fragmentary axial section of a further modification of the invention.

Figures 12 and 13 are views corresponding to Figure 8 showing variations.

Describing in illustration but not in limitation and referring to the drawings:

In the prior art it has often been difficult and expensive to obtain microlinear actuation devices and such devices, where they have depended upon the use of ordinary threads and engagement by a single thread or a few threads at a time, have often been subject to inaccuracy.

By the present invention, extremely minute actuator motions are obtained in a very simple and inexpensive manner and with a high degree of precision.

The device of the invention contemplates the use of a nut and of a screw within the nut, both of which have threads of the same hand, of the same thread form and of the same pitch. One of the elements, the nut and the screw is relatively flexible radially and the other is relatively rigid radially. By means of a wave generator acting to radially deflect the flexible element, the threads of the nut and the screw are caused to engage at circumferentially spaced locations with intermediate locations of non-engagement.

In the device of the invention, a considerable number of threads engage at one time, eliminating variations due to the tolerance variations in a single thread. Furthermore, the engagement can include spring preloading or interference fitting, so that any thread which is slightly abnormal will be deflected to agree with the dimensions of the average thread.

Furthermore it will be evident that the device of the invention makes it possible to eliminate completely backlash, or lost motion, which may occur due to looseness of thread fits in prior art devices.

The device of the invention depends upon rolling friction, and is capable of effective lubrication, so that wear can be reduced to a minimum.

In the various forms of the invention, a nut 20 has internal threads 21 which may suitably be of V formation with filleting of the sharp points at 22, as best seen in Figures 6 and 8. Any suitable thread form may be used providing it is the same as the thread forms on the screw as later described.

The nut may have lefthand threads or may have righthand threads, provided, however, that the direction of the threads is the same as the direction of the threads on the cooperating portion of the screw, as later described. The threads on the nut may be of any suitable pitch, providing, however, that the pitch of the threads on the nut should be the same as the pitch on the threads of the screw to be described.

Within the nut and in engagement with it is a screw 23 which has external threads 24. As just stated, these external threads 24 on the screw are of the same thread form, the same pitch and the same direction as the threads on the nut and the screw extends within the nut, the threads on the screw cooperating with the threads on the nut.

What has just been described applies to all of the forms of the invention.

One of the nut and the screw is relatively rigid and the other relatively flexible radially. This does not mean to imply that the flexible element need be an elastomer, as normally the screw, the nut and the wave generator to be described will all be made of a constructional metal alloy such as steel, stainless steel, bronze, beryllium copper, aluminum alloy, or the like, although in some cases an elastomer may be used for one or all of these elements, for example, nylon, polyethylene, rubber or synthetic rubber.

In the form of Figures 1 to 8 inclusive, the nut 20 is relatively rigid and the screw 23 is hollow and is thin enough to be relatively flexible radially. The screw in relaxed position will suitably be of circular cross section both exteriorly and interiorly but when installed in the nut it is deflected to an ellipsoidal cross section by wave generator 25 which is inside the screw in this form and which has, engaging the interior of the threaded portion of the screw, an ellipsoidal outer cross section 26 which of course has a major axis and a minor axis. This causes the interior bore 27 of the screw to assume an ellipsoidal contour and since the cross section of the screw is uniform around the circumference, the outside threaded surface of the screw assumes an ellipsoidal contour, as best seen in Figure 4, so that the threads on the screw engage the inside of the threads on the nut at spaced locations 28, as indicated at Figures 5 and 6, and are out of engagement at spaced locations 30 intervening between the locations 28, as best seen in Figures 7 and 8.

In the present invention the threads in Figures 7 and 8 can approximately clear as in Figure 8 or completely clear as in Figure 12 or remain meshed but disengaged as in Figure 13 with affecting the operation. It does, however, affect the amount of motion of the output per revolution of the wave generator. With a given screw diameter and a given number of threads per inch, the greater the clearance, the greater the motion per revolution.

There can be two or three or more locations 28 of engagement around the circumference with intermediate locations of disengagement of the thread in the present invention, as will be evident from my U.S. Patent No. 2,906,143, granted September 29, 1959, for Strain Wave Gearing, and my U.S. patent application Serial No. 633,254, filed January 9, 1957, for Strain Wave Gearing-Linear Actuator, both of which are incorporated herein by reference.

Mention has been made above of the ellipsoidal cross section of the wave generator and of the interior and exterior of the flexible screw. This means that the cross section is similar to an ellipse, but it differs therefrom in that it has two wave lengths, usually but not necessarily sine waves, superimposed on a circle in 360°. It will be evident, however, that advantage from the invention will be obtained by using an approach or approximation to ellipsoidal contour.

The device of the invention can be used to carry a precise adjustment from the outside into a closed vessel, and in Figures 1 to 8, the nut 20 is mounted on a tubular extension 31 from the wall 32 of a closed vessel.

It is desirable to include also a coarse adjustment between the screw and the nut, and the screw is therefore provided with a hex-head 33 by which it can be caused to turn with respect to the nut under the application of a suitable wrench.

In order that it shall be possible to deflect the screw as desired in the form of Figures 1 to 8, the hex-head 33 is connected to the screw proper by a relatively thin flexible portion 34.

The screw has a circular interior portion 35 at the hex-head, and this is engaged by a circular bearing portion 36 on the end of the wave generator, beyond which there is a hex-head 37 on the wave generator to facilitate turning of the wave generator.

In operation of the device of Figures 1 to 8, it will be evident that if the nut has 32 threads to the inch, the screw will have 32 threads to the inch in the same direction, the relationship from the standpoint of pitch and thread direction being similar to that in a standard nut and screw. When the wave generator turns, suitably with solid or liquid lubrication between the wave generator and the screw, the screw at the major axis of the cross section will be in metal-to-metal contact and in the preferred embodiment as later explained in slight interference fit with the nut. Hence it will be evident that there can be no backlash.

As the wave generator rotates, the major axis is rotated causing a rolling action between the screw threads of the nut and the screw at the major axis since the diameter of the screw is slightly smaller than the diameter of the nut. It thus will be seen that as the two surfaces roll together there must be a differential action since the two elements which are rolling over one another are of slightly different diameter. Hence there is a relative movement during the rotation which may in a specific case be one-hundredth of a revolution. There is a reduction between the rotation of the screw relative to the nut and the wave generator. Thus in the specific case of 100 to 1 ratio and 32 threads to the inch, one revolution of the wave generator will cause the screw to rotate relative to the nut one-hundredth of a revolution and this would effect a linear movement of the screw of $\frac{1}{3200}$ of an inch.

It is also obvious that as a coarse adjustment the screw could be turned with respect to the nut by engaging the wrench on the hex-head 33 in a manner similar to a standard screw and nut. Thus there is both a coarse and a fine adjustment which is very desirable for instrumentation.

There will be $\frac{1}{32}$ of an inch advance per rotation of the screw by the coarse adjustment, and $\frac{1}{3200}$ of an inch advance per rotation of the wave generator for the fine adjustment in the example given.

In Figures 9 and 10, the device is inverted, the nut 20 being flexible and the wave generator 25' surrounding the nut so that the internal surface 38 on the wave generator is ellipsoidal, causing the cross section 40 of the nut and the interior contour of the nut at the threads to be ellipsoidal, while the cross section of the screw is circular. The wave generator is turned by a spanner wrench entering the openings 41 in this form.

In the form of Figures 9 and 10, the minor axis of the nut is in intimate metal-to-metal contact with the threads of the screw. Rotation of the external wave generator causes relative motion axially between the screw and the nut.

Figure 11 illustrates a form which includes a combination of right and lefthand threads. The screw $23^2$ in this form has a righthand thread at 42 which cooperates with a righthand thread at 43 on the nut $20^2$ and the screw also has a lefthand thread at 44 which cooperates with a lefthand thread at 45 on a nut $20^3$. The screw in this case is elastic and deflected after the manner of Figures 1 to 8 and the wave generator has an ellipsoidal contour running the full length through both thread portions of the screw. The device in Figure 11 then functions in the manner of a turnbuckle, with both nuts being restrained against turning but free to move toward and away from one another, and the screw in this case being provided with no coarse adjustment.

It may in some cases be desirable to have the wave generator adjustable so as to cause adjustable interference between the threads of the screw and the nut and assure zero backlash. Adjustability of the wave generator is shown in my copending application Serial No. 717,709, filed February 26, 1958, for Wave Generator.

Also, preloading of the flexible threads into contact with the more rigid threads will desirably be obtained as described in my copending application Serial No. 779,454, filed December 10, 1958, for Strain Wave Gearing-Spring Preloading.

The spring loading of the flexible member may result in slight deflection of the relatively rigid threaded member also, since it will tend to maintain its circular form and this will tend to preload the threads.

It will be evident that in the device of the invention it is possible to obtain a linear motion of the order of $\frac{1}{10,000}$ inch per revolution of the wave generator. By varying the difference in the circumference of the flexible threads and the relatively rigid threads, the desired axial motion per turn of the fine adjustment can be obtained. The change of the pitch of the threads will also vary the fine adjustment. The coarse adjustment can be changed by varying the pitch of the threads.

For example, if there were 4 threads per inch and the clearance between the nut and the screw produced a reduction ratio of 60 to 1, one rotation of the wave generator would produce a fine adjustment of $\frac{1}{240}$ of an inch.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a linear actuator, a nut element having an inside thread, a screw element having an outside thread within the nut, one of the nut and the screw elements being relatively rigid radially and the other being relatively flexible radially, the threads on the nut and the screw being of the same hand, of the same thread form and the same pitch, the threads of the nut and the screw engaging at circumferentially spaced locations with intermediate locations of non-engagement, and means for deflecting said flexible element into engagement with said other element at said plurality of locations and for progressing the locations of engagement of the threads around the circumference.

2. A linear actuator of claim 1, in which the screw is the filexible element and is hollow and the means for deflecting the screw is positioned inside and engages the interior of the screw.

3. A linear actuator of claim 1, in which the flexible element is the nut and the means for deflecting the nut is positioned around the nut.

4. A linear actuator of claim 1, including one set of a screw and a nut having threads of one hand and another set of a cooperating screw and nut having threads of the opposite hand.

5. A linear actuator of claim 4, in which the flexible element is a screw which is hollow and the means for deflecting the screw extends through the interior of the screw at the position at which the threads are of one hand and at the position at which the threads are at the opposite hand.

6. A linear actuator of claim 1, in combination with means for relatively turning the screw with respect to the nut in order to obtain a coarse adjustment.

7. A linear actuator of claim 1, in which there is an interference fit between the screw and the nut.

References Cited in the file of this patent

UNITED STATES PATENTS

| | | |
|---|---|---|
| 2,338,271 | Ulanet | Jan. 2, 1944 |
| 2,565,628 | Rauilious | Aug. 28, 1951 |
| 2,567,483 | Hotine | Sept. 11, 1951 |
| 2,893,130 | Irokomos | July 7, 1959 |
| 2,943,508 | Musser | July 5, 1960 |

FOREIGN PATENTS

| | | |
|---|---|---|
| 354,006 | Great Britain | Aug. 6, 1931 |

UNITED STATES PATENT OFFICE
CERTIFICATION OF CORRECTION

Patent No. 2,979,964 April 18, 1961

C Walton Musser

It is hereby certified that error appears in the above numbered patent requiring correction and that the said Letters Patent should read as corrected below.

Column 2, lines 68 and 71, column 3, lines 2, 4, 29, and 37, and column 4, lines 23, 25, and 40, for "ellipsoidal", each occurrence, read -- elliptoidal --.

Signed and sealed this 17th day of April 1962.

(SEAL)
Attest:

ESTON G. JOHNSON
Attesting Officer

DAVID L. LADD
Commissioner of Patents